United States Patent
Tanaka et al.

(10) Patent No.: US 11,941,965 B2
(45) Date of Patent: Mar. 26, 2024

(54) INFORMATION PROCESSING APPARATUS ISSUING WARNING TO PERSON AT RISKY POINT, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Yurika Tanaka, Yokosuka (JP); Shuichi Sawada, Nagoya (JP); Takaharu Ueno, Nagoya (JP); Shin Sakurada, Toyota (JP); Daiki Yokoyama, Gotemba (JP); Genshi Kuno, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 366 days.

(21) Appl. No.: 17/394,026

(22) Filed: Aug. 4, 2021

(65) Prior Publication Data
US 2022/0051540 A1 Feb. 17, 2022

(30) Foreign Application Priority Data
Aug. 11, 2020 (JP) .................. 2020-136041

(51) Int. Cl.
*G06K 9/00* (2022.01)
*G06V 20/52* (2022.01)
(Continued)

(52) U.S. Cl.
CPC ......... *G08B 21/0476* (2013.01); *G06V 20/52* (2022.01); *G06V 40/20* (2022.01); *G08B 3/10* (2013.01)

(58) Field of Classification Search
CPC ........ G06V 20/52; G06V 20/53; G06V 20/54; G06V 20/50; G06V 20/00; G06V 20/38;
(Continued)

(56) References Cited

U.S. PATENT DOCUMENTS

| 2012/0194554 | A1* | 8/2012 | Kaino | G08B 13/19613 |
| | | | | 345/633 |
| 2019/0205659 | A1* | 7/2019 | Cuban | G06V 20/41 |

(Continued)

FOREIGN PATENT DOCUMENTS

| JP | H10-087254 A | 4/1998 |
| JP | 2001-351190 A | 12/2001 |

(Continued)

*Primary Examiner* — Atiba O Fitzpatrick
(74) *Attorney, Agent, or Firm* — Oliff PLC

(57) ABSTRACT

An object of the present disclosure is to enable a warning to be issued to a person who is highly likely to be put in danger at a risky point. In an information processing apparatus, a controller acquires information indicating a risky point, acquires a state of a person with a predetermined positional relationship to the risky point, and determines whether or not the state of the person is a state where there is a high possibility of being put in danger, among a plurality of states of the person assumable at the risky point. Furthermore, in a case where the state of the person is determined to be the state where there is a high possibility of being put in danger, the controller causes an output unit to output information indicating a warning.

10 Claims, 11 Drawing Sheets

(51) Int. Cl.
*G06V 40/20* (2022.01)
*G08B 21/04* (2006.01)
*G08B 3/10* (2006.01)

(58) Field of Classification Search
CPC ........ G06V 20/39; G06V 20/44; G06V 20/46;
G06V 20/40; G06V 40/00; G06V 40/10;
G06V 40/103; G06V 40/23; G06V 40/25;
G06V 40/20; G08B 21/02; G08B
21/0476; G08B 3/10; G08B 21/00; G08B
21/04; G08B 21/0407; G08B 21/0423;
G08B 21/043; G08B 3/1008; G08B
3/1016; G08B 3/00
See application file for complete search history.

(56) References Cited

U.S. PATENT DOCUMENTS

| | | | | |
|---|---|---|---|---|
| 2019/0236374 | A1* | 8/2019 | Nakagawa | G06V 20/46 |
| 2020/0184202 | A1* | 6/2020 | Suzuki | H04N 23/54 |
| 2020/0234573 | A1* | 7/2020 | Fujii | G05D 1/0289 |
| 2021/0042533 | A1* | 2/2021 | Hodge | G06V 40/20 |
| 2023/0143300 | A1* | 5/2023 | Eguchi | G08B 21/02 |
| | | | | 382/115 |

FOREIGN PATENT DOCUMENTS

| | | |
|---|---|---|
| JP | 2003-224844 A | 8/2003 |
| JP | 2013-097606 A | 5/2013 |
| JP | 2018-195194 A | 12/2018 |
| JP | 2019-114184 A | 7/2019 |

* cited by examiner

| RISKY POINT | CAMERA | POSITION OF RISKY POINT | STATE OF RISK | RISK | PERSON'S STATE 1 | PERSON'S STATE 2 | PERSON'S STATE 3 | ATTRIBUTE |
|---|---|---|---|---|---|---|---|---|
| A | FIXED #1 | P1 | FROZEN ROAD SURFACE | OVERTURNING | APPROACHING | HIGH MOVEMENT SPEED | BICYCLE | ELDERLY/ DISABLED PERSON |
| B | FIXED #2 | P2 | CONSTRUCTION WORK AT HIGH LEVEL | HIT BY FALLEN OBJECT | APPROACHING | NO HELMET | | ELDERLY/ DISABLED PERSON |
| C | FIXED #3 | P3 | OBSTACLE | COLLISION INTO OBSTACLE | APPROACHING | HIGH MOVEMENT SPEED | LOW MOVEMENT SPEED | ELDERLY/ DISABLED PERSON |
| D | FIXED #4 | P4 | HIDDEN TRAFFIC MIRROR | COLLISION UPON ENCOUNTER | APPROACHING | | | ELDERLY/ DISABLED PERSON |
| E | ON-BOARD | P5 | DAMAGED HANDRAIL | OVERTURNING | APPROACHING | LOW MOVEMENT SPEED | WITH A STICK | ELDERLY/ DISABLED PERSON |

Fig. 4

| PERSON | REGISTRATION/ NON-REGISTRATION | POSITION | RISKY POINT A | | | ATTRIBUTE |
| | | | STATE 1 | STATE 2 | STATE 3 | |
|---|---|---|---|---|---|---|
| Y1 | No | | APPROACHING | BICYCLE | | |
| Y2 | No | | MOVING AWAY | HIGH MOVEMENT SPEED | | |
| Y3 | No | | DIFFERENT DIRECTION | LOW MOVEMENT SPEED | | |
| Y4 | Yes | Pa | | | | ELDERLY PERSON |
| Y5 | Yes | Pb | | | | DISABLED PERSON |

Fig. 5

INFORMATION PROCESSING APPARATUS ISSUING WARNING TO PERSON AT RISKY POINT, INFORMATION PROCESSING METHOD, AND NON-TRANSITORY STORAGE MEDIUM

CROSS REFERENCE TO THE RELATED APPLICATION

This application claims the benefit of Japanese Patent Application No. 2020-136041, filed on Aug. 11, 2020, which is hereby incorporated by reference herein in its entirety.

BACKGROUND

Technical Field

The present disclosure relates to an information processing apparatus, an information processing method, and a non-transitory storage medium.

Description of the Related Art

Conventionally, there is a technology for detecting contact of a foreign object based on displacement of a skirt guard whereby a vibration generator provided at a skirt guard panel causes the panel to vibrate and issues a warning to a rider through vibration to a foot to thereby cause the foot (a shoe) to be pulled back (for example, Patent Literature 1).

CITATION LIST

Patent Literature

Patent Literature 1: Japanese Patent Laid-Open No. H10-87254

SUMMARY

An object of the present disclosure is to provide an information processing apparatus, an information processing method, and a non-transitory storage medium that are capable of issuing a warning to a person who is highly likely to be put in danger at a risky point.

An information processing apparatus according to a mode of the present disclosure may include a controller configured to execute: determining whether or not a state of a person with a predetermined positional relationship to a risky point is a state where there is a high possibility of being put in danger, among a plurality of states of the person assumable at the risky point; and causing an output unit to output information indicating a warning in a case where the state of the person is determined to be the state where there is a high possibility of being put in danger.

A mode of the present disclosure may include at least one of an information processing method, an information processing system, a program, and a recording medium recording the program, each including characteristics similar to those of the information processing apparatus.

According to the present disclosure, a warning may be issued to a person who is highly likely to be put in danger at a risky point.

BRIEF DESCRIPTION OF THE DRAWINGS

FIG. 4 illustrates an example data structure of a management table for risky points;

FIG. 5 illustrates an example data structure of a management table for persons;

DESCRIPTION OF THE EMBODIMENTS

An information processing apparatus according to an embodiment may include a controller.

The controller determines whether or not a state of a person with a predetermined positional relationship to a risky point is a state where there is a high possibility of being put in danger, among a plurality of states of the person assumable at the risky point.

The controller causes an output unit to output information indicating a warning in a case where the state where there is a high possibility of the person being put in danger is determined.

The information processing apparatus issues a warning when the state of a person with a predetermined positional relationship to a risky point is the state where there is a high possibility of being put in danger at the risky point. Accordingly, a person who is currently not at a risky point but who is highly likely to be put in danger by going to the risky point may be stopped from moving to the risky point or may be urged to take a detour or to act carefully.

A state where there is a high possibility of being put in danger at a risky point is a state, among a plurality of states of a person that are assumable at the risky point, with a possibility that is higher than a possibility in any one state when possibilities of the person being put in danger at the risky point are compared. For example, for a person moving on a frozen road surface, a walking state, a running state, and a state of riding a bicycle are assumable as a state (a behavior state or a movement mode) of the person. Of these states, the running state and the state of riding a bicycle are states with higher possibilities of being put in danger of "slipping and falling over" than the walking state.

Hereinafter, the information processing apparatus, an information processing method, and a program according to the embodiment will be described with reference to the drawings. Configurations of the embodiment are merely examples, and the present disclosure is not limited to the configurations of the embodiment.

<System Configuration>

Figure 1:
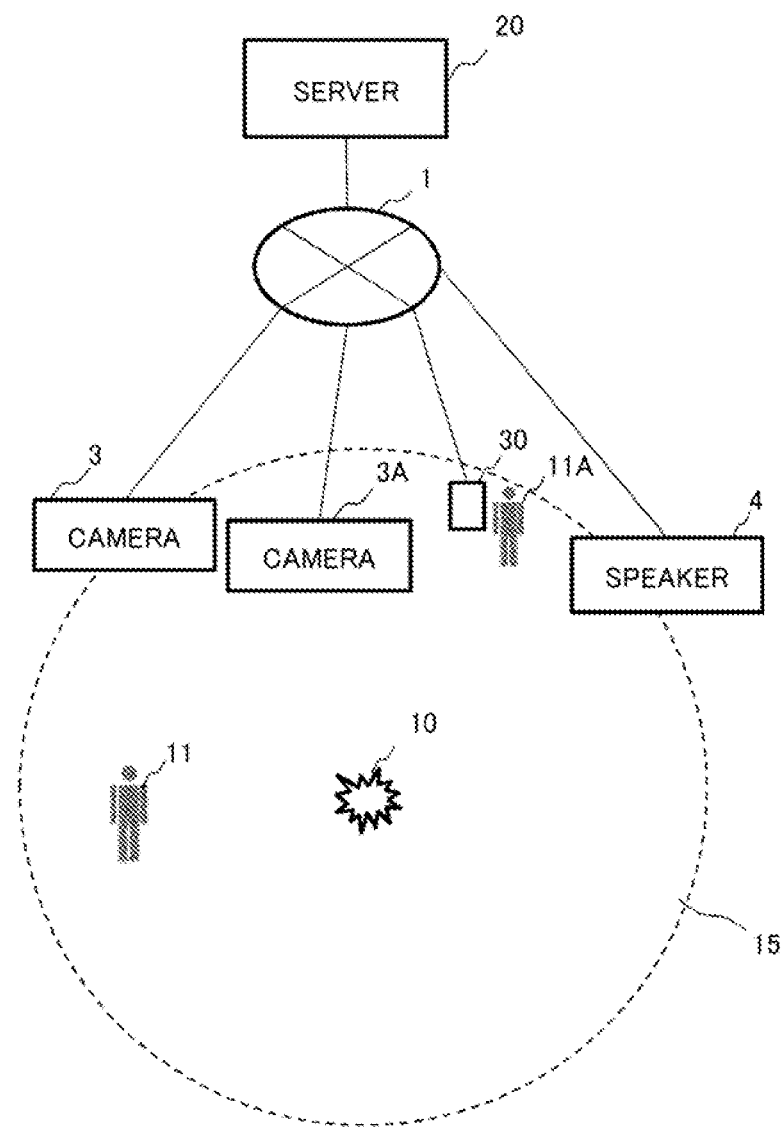
FIG. 1 illustrates an example configuration of an information processing system according to an embodiment.

FIG. 1 is a schematic diagram of an information processing system according to the embodiment. In FIG. 1, the information processing system is a system that issues a warning to a person who is highly likely to be put in danger at a risky point. In FIG. 1, the information processing system includes a network 1, and a server 20, a camera 3, a camera 3A, a speaker 4, and a terminal 30 that are connected to the network 1.

For example, the network 1 is a public communication network such as the Internet, and a wide area network (WAN) or other communication networks may be used. The network 1 may include a cellular network of long term evolution (LTE), 5G or the like, or a wireless network (a wireless path) of a wireless local area network (LAN; Wi-Fi included), BLE or the like.

The server 20 is an example of "information processing apparatus". The server 20 receives captured images (videos) from the cameras 3 and 3A, and detects (identifies) risky points 10 from the captured images. However, detection of risky points 10 may be performed by other than the cameras 3 and 3A, for example, by using a sensor.

For example, the cameras 3 and 3A each capture a movement route of persons. The movement route may be indoors or outdoors. Furthermore, an outdoor place may be a town or a suburb. A movement route outdoors may be a road or a path on premises. In the present embodiment, the cameras 3 and 3A each capture a scene in a town, and a movement route of persons is shown in the scene in the town in the captured image.

The camera 3 is a fixed camera installed in the town. For its part, the camera 3A is an on-board camera that is mounted on a vehicle 50 (FIG. 2) that travels in the town. One of the cameras 3 and 3A may be omitted. Furthermore, the number of each of the cameras 3 and 3A may be set to one or more as appropriate. Additionally, the cameras 3 and 3A may each be capable of changing a capturing range (a field of view) by left/right rotation and vertical movement. Moreover, the cameras 3 and 3A may each include a zoom function.

The risky point 10 is a point where the possibility of a person in a certain state being put in danger is increased. The risky point 10 may be a point where a risky state is constantly present, or may be a point where a state is changed due to occurrence of an event related to weather or a human activity, for example, and where safety of movement of persons is temporarily reduced until the state is restored. For example, the risky point 10 is a point on a movement route of persons, but may be other than the movement route. A point where safety of movement is temporarily reduced may be a point, on the movement route of persons, where safety of movement of persons is reduced by occurrence of an event compared to before occurrence of the event.

A point where safety is temporarily reduced may be a point where a road surface of the movement route is frozen or submerged in water due to an event such as snow, flood, or burst of a water pipe, for example. Furthermore, a point where safety is temporarily reduced may be a point where a depression or a step is temporarily formed in the movement route due to an event such as replacement of a trench grate or road surface construction such as paving. Alternatively, a point where safety is temporarily reduced may be a point on the movement route where an obstacle is placed (a point where there is occurrence of an event "placement of an obstacle"). An obstacle includes construction equipment such as a traffic cone, a vehicle that is parked or stopped for unloading or due to an accident, an emergency vehicle, and the like.

Furthermore, a point where safety is temporarily reduced includes a construction or cleaning point on the movement route or a structure facing the movement route, and is a point where a depression is formed in the ground due to excavation of a road surface for water pipe or gas pipe construction, or is a movement route below a point where construction work is being performed at a high level of a structure facing the movement route, for example. A construction work at a high level may be a construction work performed by climbing up a utility pole facing the movement route (a road), or cleaning of a window or a wall surface of a building facing the road, for example.

Furthermore, a point where safety is temporarily reduced may be a point where a traffic support structure provided on the movement route is damaged or removed. A traffic support structure is for supporting movement of an elderly person or a disabled person, such as a handrail, a guard rail, tactile paving for guiding visually impaired persons, and the like. Moreover, a point where safety is temporarily reduced may be a point where visibility of a traffic mirror is reduced, or in other words, a point where visibility of a traffic mirror is reduced due to a change in an installation angle cause by an accident or due to a mirror surface being covered a growing plant, for example.

The server 20 detects a risky point 10 from a captured image from the camera 3 or 3A, and also detects a person 11 with a predetermined positional relationship to the risky point 10. In the example illustrated in FIG. 1, a person 11 present in a circle 15 with a predetermined radius around a position of the risky point 10 (that is, a person 11 present in a predetermined geographical range of the risky point 10) is detected. However, a person 11 may alternatively be detected from other than the captured images from the cameras 3 and 3A, such as by a sensor installed in the town or a sensor carried by the person 11. A person 11 may alternatively be detected by visually checking a captured image.

The server 20 determines, based on information indicating a state of a person 11, whether or not the state of the person 11 is a state where there is a high possibility of the person 11 being put in danger at the risky point 10. For example, in a state where the person 11 is moving at a speed higher than walking by riding a bicycle or an electric motorcycle, there is a high possibility of falling over at the time of passing a point where the road surface is frozen. Accordingly, in the case where the risky point 10 is a point where the road surface is frozen, the person 11 riding a bicycle is determined to be in a state where there is a high possibility of being put in danger. The server 20 outputs information indicating a warning in a case of determining the state where there is a high possibility of the person 11 being put in danger. Information indicating a warning is outputted to the speaker 4. A warning sound is sounded from the speaker 4, for example.

Alternatively, the speaker 4 may issue a sound indicating information indicating the risky point 10 (for example, an intersection ahead), a state of risk (for example, frozen road surface), and a state of a person who is highly likely to be put in danger (for example, a state of being on or riding a bicycle). The number and installation points of the speakers 4 may be set as appropriate. A large display may be used instead of or together with the speaker 4, and information indicating a warning may be displayed on the display.

Information indicating a warning may be transmitted to the terminal 30. For example, at least one of the information indicating the risky point 10, the information indicating the state of risk, and the information indicating the state of a person who is highly likely to be put in danger is transmitted. The information may be displayed on a display 35 (FIG. 6) of the terminal 30 by pop-up display, for example. Furthermore, the information indicating a warning may be transmitted by at least one of output of sound or light from the terminal 30 and vibration of the terminal 30.

<Description of Risky Point>

Figure 2:
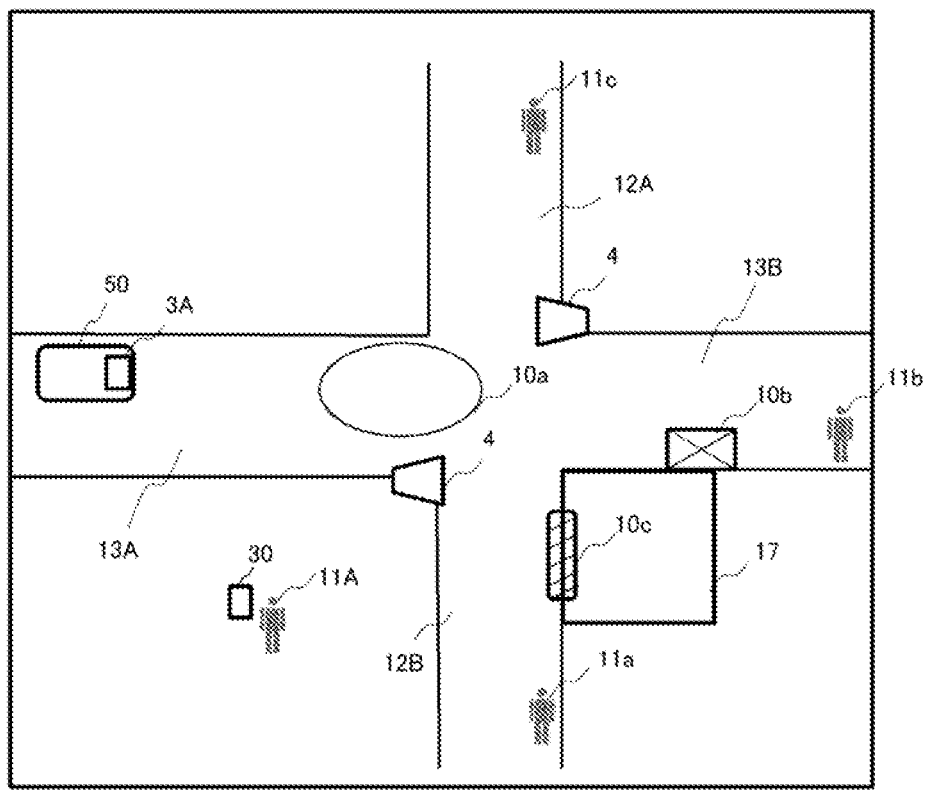
FIG. 2 is an explanatory diagram of risky points.

FIG. 2 is an explanatory diagram of the risky points. FIG. 2 illustrates an example of a captured image from the camera 3. The camera 3 captures an image (a video) having, at a center, an intersection of roads 12A and 12B and roads 13A and 13B. The roads 12A, 12B, 13A, 13B are each an example of a movement route where persons move (pass).

In the example illustrated in FIG. 2, there is a point, extending over the road 13A and the intersection, where the road surface is frozen (a frozen point 10a), and there is a possibility of a bicycle or an electric motorcycle falling over at the time of turning right from the road 12A to the road 13A. Furthermore, an obstacle 10b (such as a crashed car) is parked at an edge of the road 13B, and if a pedestrian is to pass by while avoiding the obstacle 10b, the pedestrian will stray greatly onto the road 13B. Moreover, a wall surface construction work is performed at a high level of a building 17 (an example of a structure) facing the road 12B (illustrated as a construction point 10c). Accordingly, a falling object may hit a person passing below the construction point 10c. The frozen point 10a, the obstacle 10b, and the construction point 10c each correspond to the risky point 10. Accordingly, the server 20 sounds a warning from the speaker 4 to persons 11a, 11b, 11c who are present, respectively, in the periphery of the frozen point 10a, the obstacle 10b, and the construction point 10c (that is, persons with a predetermined positional relationship to the risky points), and thereby notifies of the state where there is a high possibility of being put in danger. Furthermore, in relation to a person 11A whose terminal 30 is registered, information indicating a warning is transmitted to the terminal 30. The device used for notification is not limited to the speaker 4, and may alternatively be a display (a display device).

<Server Configuration>

Figure 3:
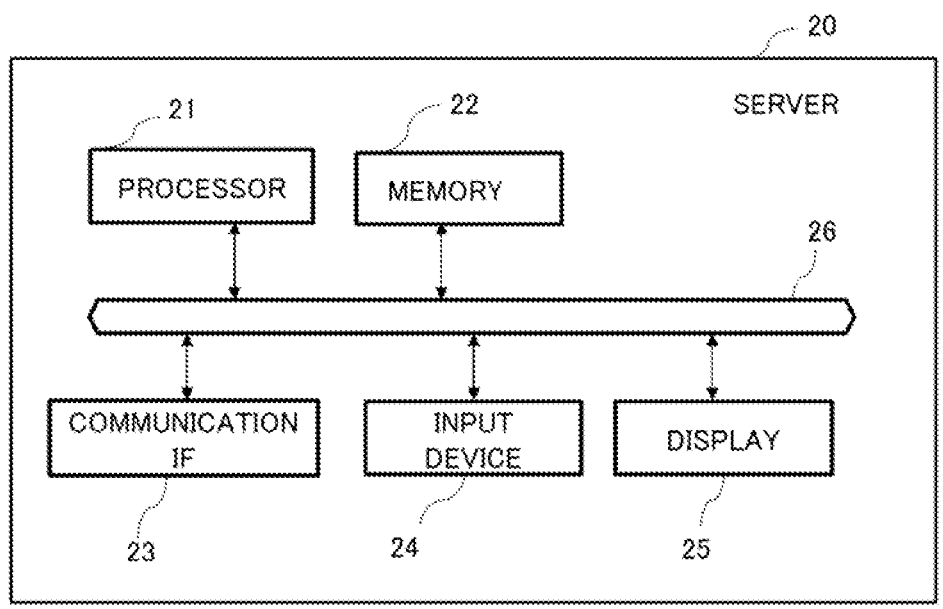
FIG. 3 illustrates an example configuration of a server.

FIG. 3 illustrates an example configuration of the server 20. The server 20 may be a general-purpose information processing apparatus (a computer) such as a personal computer (PC) or a workstation, or may be a dedicated information processing apparatus such as a server machine. The server 20 includes a communication function, and is capable of connecting to the network 1 in a wired or wireless manner.

The server 20 includes a processor 21 as a processing unit or a controller, a memory 22, a communication interface 23 (a communication IF 23), an input device 24, and a display 25 that are interconnected by a bus 26. The server 20 may be one information processing apparatus, or a may be a collection (a cloud) of two or more information processing apparatuses.

The memory 22 includes a main memory and an auxiliary memory. The main memory is used as a storage area for programs and data, a program development area, a program work area, a buffer area for communication data, and the like. The main memory is a random access memory (RAM) or a combination of the RAM and a read only memory (ROM). The auxiliary memory is used as a storage area for data and programs. For example, as the auxiliary memory, non-volatile storage media such as a hard disk, a solid state drive (SSD), a flash memory, an electrically erasable programmable read-only memory (EEPROM) and the like may be used.

The communication IF 23 is a circuit that performs a communication process. For example, the communication IF 23 is a network interface card (NIC). Furthermore, the communication IF 23 may be a circuit that performs wireless communication (LTE, wireless LAN (Wi-Fi), etc.), or may include the NIC and a wireless communication circuit.

The input device 24 includes keys, buttons, a pointing device, a touch panel and the like, and is used to input information. For example, the display 25 is a liquid crystal display, and displays information and data.

The processor 21 is a central processing unit (CPU), for example. The processor 21 performs various processes by executing various programs stored in the memory 22.

For example, the processor 21 acquires captured images from the cameras 3 and 3A, and detects the risky points 10 from the captured images from the cameras 3 and 3A. The processor 21 may detect the risky points 10 from the captured images from the cameras 3 and 3A by performing a determination process using matching with a normal state (an image of a state where safety is secured), machine learning, or deep learning. Instead, an operator may refer to a captured image displayed on the display 25 and detect (identify) the risky point 10, and may set the risky point 10 in the server 20 by using the input device 24. Furthermore, the processor 21 may detect the risky point 10 by other than the cameras 3 and 3A (for example, by using a sensor).

The processor 21 of the server 20 detects a person 11 with a predetermined positional relationship to a risky point 10. For example, a person 11 shown in a captured image from the camera 3 or 3A may be detected using a facial recognition technique. For example, a person 11 present in a predetermined geographical range (for example, the circle 15 in FIG. 1) of a risky point 10 may be detected.

At this time, a distance between the position of the risky point 10 and the position of a person 11 may be calculated based on a view from the camera (the captured image), and a person 11 who is present outside the circle 15 may be excluded. Additionally, detection of a person 11 may be performed by using other than facial recognition. Furthermore, detection of a person 11 may be performed by using a sensor other than the cameras 3 and 3A. The sensor may be one that is installed in the town, or one that is carried or worn by a person 11.

Furthermore, a predetermined positional relationship may be that the person 11 is at a position that is less than a predetermined distance from the risky point 10. Furthermore, for example, the processor 21 may measure a distance between the position of the risky point 10 and the position of a person based on the view from the camera 3 or 3A, and may detect a person 11 who is present at less than a predetermined distance among persons shown in the captured image from the camera 3 or 3A.

Furthermore, the present embodiment also adopts a configuration where the person 11 registers the terminal 30 in the server 20, and where the position of the terminal 30 detected by the terminal 30 is reported to the server 20 on a regular basis. In this case, in the case illustrated in FIG. 1, for example, the processor 21 detects a person 11A carrying the terminal 30, the position of which is within the circle 15.

Furthermore, the processor 21 determines, based on the state of a person 11 with the predetermined positional relationship to the risky point 10, whether or not the person 11 is in a state where there is a high possibility of being put in danger at the risky point 10.

The state of a person 11 includes a state that indicates a change of the position relative to the risky point 10. For example, the state of a person 11 includes at least one of a state of facing the risky point 10, a state of moving toward the risky point 10, a state of being close to the risky point 10, a state of moving away from the risky point 10, and a state of moving in a direction different from a direction of the risky point 10.

For example, the state of a person 11 includes a state regarding a movement method and, for example, includes at least one of a state where the person 11 is walking, a state of running, a state of riding a bicycle or an electric motorcycle, a state of walking with a stick, a state of pushing a walker, and a state of riding an electric cart. Furthermore, the state of a person 11 includes a state regarding a movement speed, that is, at least one of a state where the movement speed is exceeding a threshold and a state where the movement speed is below a threshold.

Furthermore, the state of a person 11 includes a state indicating presence/absence of equipment or a tool with which the possibility of being put in danger at the risky point 10 may be avoided or reduced. The equipment or the tool may be a helmet, boots, gloves, goggles, or the like.

Determination of the state of a person 11 as described above is performed by the processor 21 performing image recognition on a captured image and working out the state of the person 11. The processor 21 determines a state where the person 11 is highly likely to be put in danger at the risky point 10, in a case where the state of the person 11 is the state, of a person who is highly likely to be put in danger, matching the state of risk at the risky point 10.

FIG. 4 illustrates an example data structure of a management table for risky points 10, and FIG. 5 illustrates an example data structure of a management table for persons 11. The management table for risky points 10 includes a record (an entry) prepared for each risky point. In the example illustrated in FIG. 4, an example is illustrated where risky points A to E are detected as the risky points 10, and five corresponding entries are registered in the management table.

An entry stores information for specifying the camera 3 or 3A that captured the captured image from which the risky point 10 is detected, information indicating the position of the detected risky point 10, the state of risk, information indicating an expected risk (a risk one is put at), one or more states of a person that are associated with the state of risk (person's state 1, . . . , 3), and an attribute of the person. In the example illustrated in FIG. 4, the risky points A to C are detected from a captured image from a camera 3 that is a fixed camera #1, and the risky point D is detected from a captured image from a camera 3 that is a fixed camera #2 different from the fixed camera #1. Furthermore, the risky point E is detected from a captured image from a camera 3A that is an on-board camera #1.

As position information of a risky point, a value that is obtained by converting coordinates on a captured image into geographical plane coordinates is stored, for example. A set of the state of risk, an expected risk, and information indicating association to the state of a person is stored in the memory 22 in advance (or may be acquired by the server 20 from the network 1 as necessary).

When a risky point 10 is detected from a captured image and the state of the risk is detected, the processor 21 reads out the corresponding set of the state of risk, the expected risk, and information indicating association to the state of a person, and registers the same in a corresponding entry in the management table. At this time, if there is a plurality of states of a person associated with the state of risk, all the states are read out. In the example illustrated in FIG. 4, a maximum of three states of a person are associated with the state of risk.

In relation to states 1, 2, and 3 of a person, AND (logical conjunction) or OR (logical disjunction) may be applied. In the example illustrated in FIG. 4, AND is applied to the state 1 of a person and the states 2 and 3 of a person, and OR is applied to the states 2 and 3 of a person.

For example, in relation to the state of risk "frozen road surface", "overturning" is associated as the expected risk (the risk one is put at), and a person 11 for whom the person's state 1 "approaching" and one of the state 2 "high movement speed (exceeding threshold)" and the state 3 "bicycle" are true is set (defined) to be in a state where there is a high possibility of being put in danger at the risky point 10.

Furthermore, in the present embodiment, as an option, the above-described set of information pieces indicating the state of risk, the risk one is put at, and the person's state further includes information indicating the attribute of a person. In the example illustrated in FIG. 4, the attribute of a person indicates an elderly person or a disabled person.

The management table illustrated in FIG. 5 is prepared for each risky point. FIG. 5 illustrates the management table where persons 11 with a predetermined positional relationship to the risky point A illustrated in FIG. 4 are registered. The management table includes a record (an entry) prepared for each person 11, and identification information of the person 11, information indicating registration/non-registration of the terminal 30 carried by the person 11, the position of the terminal 30, information indicating one or more states of the person 11, and information indicating the attribute of the person are registered in the entry.

Information of a person who registered the terminal 30 is stored in the memory 22, and the information of a person stores personal information of the person (such as a name, contact information and the like), identification information of the terminal 30 (unique information and a network address of the terminal 30), the attribute of the person (elderly person or disabled person), and position information of the terminal 30 that is reported on a regular basis. In relation to a person whose terminal 30 is registered, that the terminal 30 is registered, the position of the terminal 30, and the attribute are registered (copied) in the corresponding entry in the management table for persons 11.

Furthermore, as the states 1 to 3, information indicating one or more states of the person 11 that are detected from a captured image or the like are registered. One or more states of the person 11 corresponding to the state of risk at the risky point 10 are detected and registered.

The processor 21 compares the state of a person registered in an entry for the risky point 10 and the state of a person in the management table for persons 11 corresponding to the entry for the risky point 10, and determines whether or not the person is in a state where there is a high possibility of being put in danger, based on whether or not the person 11 has a state that is determined to be a state where movement to the risky point 10 will result in a high possibility of being put in danger.

In a case where the state where the person is highly likely to be put in danger is determined, the processor 21 performs control such that the communication IF 23 as an output unit outputs (transmits) information indicating a warning to a predetermined speaker 4 (such as a speaker 4 nearest to the risky point 10). Information indicating a warning may include information indicating the state of risk and information indicating the state of a person who is highly likely to be put in danger.

<Configuration of Terminal>

Figure 6:
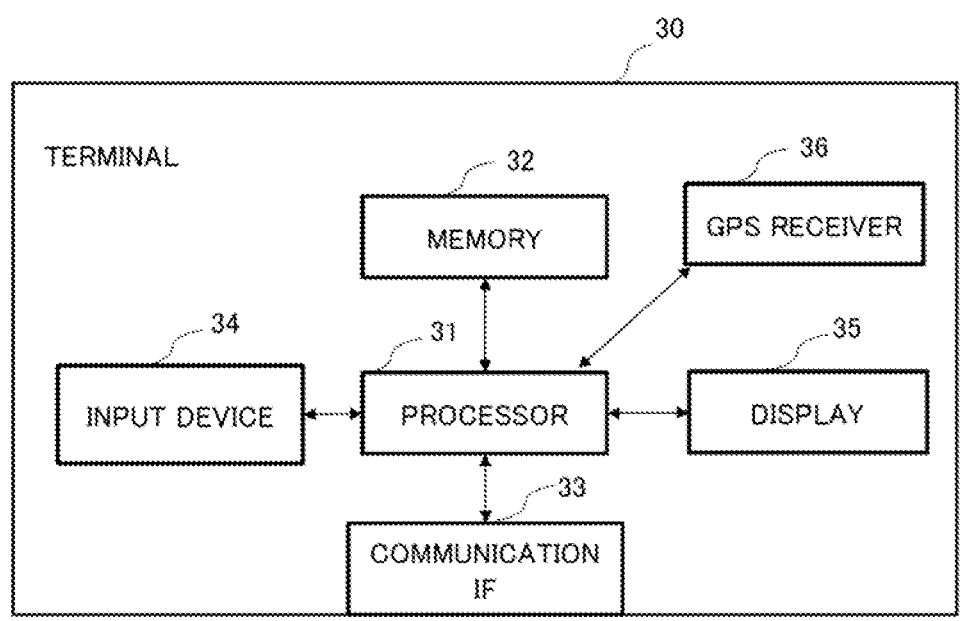
FIG. 6 illustrates an example configuration of a terminal.

FIG. 6 illustrates an example configuration of the terminal 30. The terminal 30 is a portable terminal (a mobile terminal: a terminal having portability) having a wireless communication function. The portable terminal is a smartphone, a tablet terminal, a laptop personal computer (PC), a personal digital assistant (PDA), or a wearable computer, for example. However, a terminal that is used at the time of registering the terminal 30 in the server 20 may be the terminal 30 or a mobile terminal or a fixed terminal other than the terminal 30.

The terminal 30 includes a processor 31, a memory 32, a communication interface (a communication IF) 33, an input device 34, a display 35, and a GPS receiver 36. Those that are similar to the processor 21, the memory 22, the communication IF 23, the input device 24, and the display 25 may be used as the processor 31, the memory 32, the communication IF 33, the input device 34, and the display 35. However, capacities may be different from those used by the server 20 depending on the use, the purpose of use, and the like.

The processor 31 performs various processes by executing various programs stored in the memory 32. For example, the processor 31 performs a process of transmitting, to the server 20, registration information including the personal information of a person, the identification information of the terminal 30, and the attribute of the person (elderly person or disabled person), and performs a process of registering the terminal 30 (the registration information) in the server 20.

Furthermore, the processor 31 performs control to report (transmit) to the server 20, on a regular basis or periodically, the position information of the terminal 30 that is detected by the GPS receiver 36. Moreover, the processor 31 performs a process of displaying information indicating a warning received from the server 20 on the display 35 or of sounding such information from a speaker provided in the terminal 30.

Additionally, a plurality of CPUs or a multicore CPU may be used as each of the processor 21 and the processor 31. At least a part of processes performed by the CPU may be performed by a processor other than the CPU, such as a digital signal processor (DSP) or a graphical processing unit (GPU). Moreover, at least a part of processes performed by the CPU may be performed by a dedicated or general-purpose integrated circuit such as an application specific integrated circuit (ASIC) or a field programmable gate array (FPGA), or by a combination of a processor and an integrated circuit. Such a combination is referred to as a microcontroller (MCU), a system-on a-chip (SoC), a system LSI, or a chipset, for example.

<Example Operation>

Figure 7:
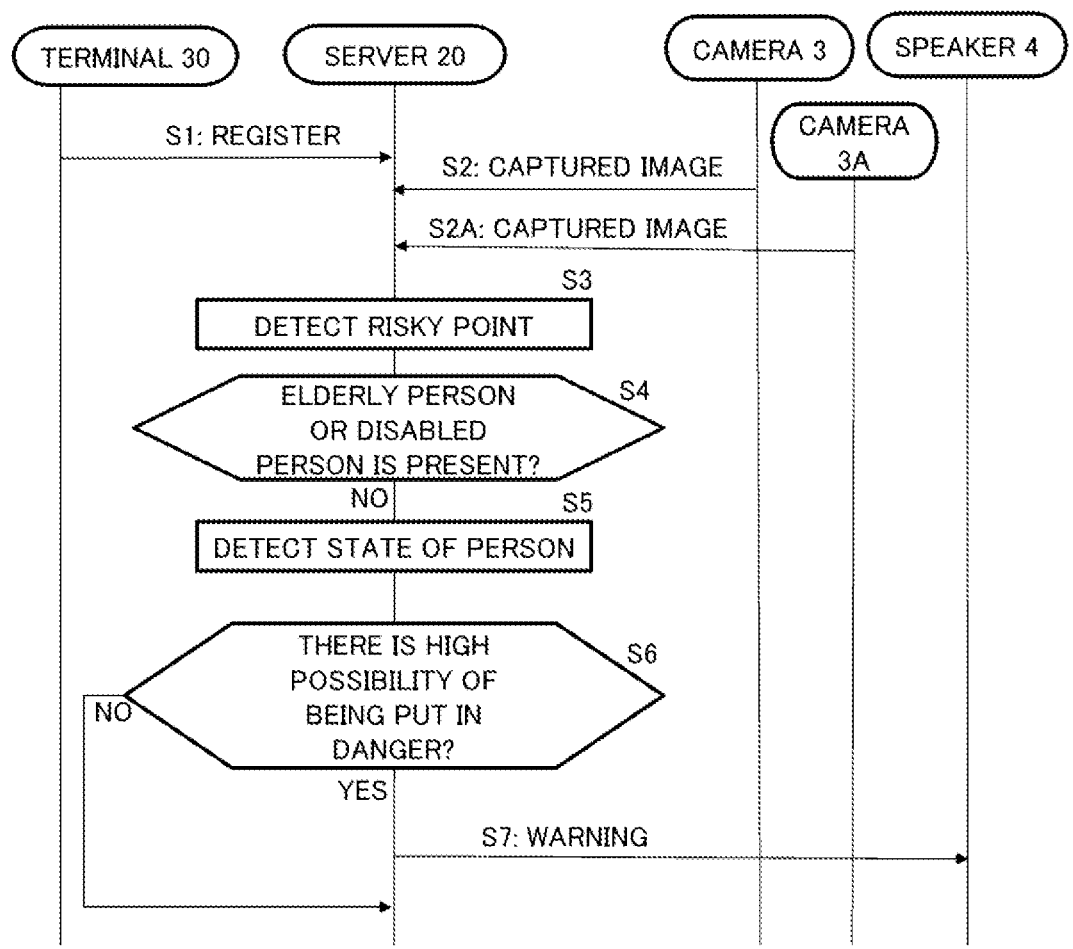
FIG. 7 is a sequence diagram illustrating an example operation of the information processing system.
Figure 8:
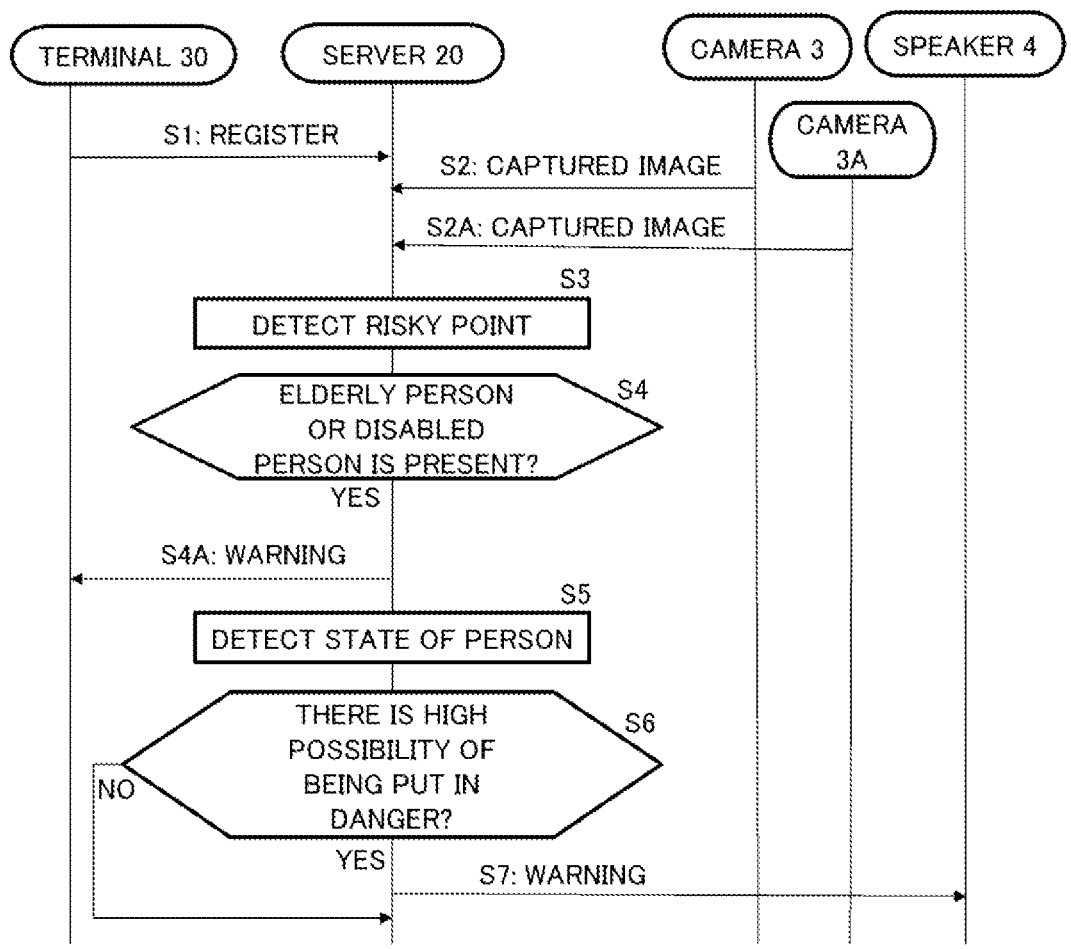
FIG. 8 is a sequence diagram illustrating the example operation of the information processing system.

In the following, an example operation of the information processing system will be described. FIGS. 7 and 8 are sequence diagrams illustrating an example operation of the information processing system. In FIG. 7, the terminal 30 of a certain person transmits the registration information to the server 20 by being operated by the person (step S1). The server 20 registers the terminal 30 in the server 20 by storing the registration information in the memory 22.

The server 20 receives, via the network 1, captured images captured by the cameras 3 and 3A (steps S2 and S2A). The server 20 detects a risky point 10 from the captured images, and creates the management table for risky points 10 (FIG. 4; step S3).

The server 20 determines whether or not there is an elderly person or a disabled person with a predetermined positional relationship to the risky point 10. That is, the server 20 determines whether a person 11A whose terminal 30 and attribute (elderly person or disabled person) are registered in the server 20 is included in persons with a predetermined positional relationship to the risky point 10 (step S4).

In the case where the person 11A is not included (NO in S4), the server 20 detects a person 11 with a predetermined positional relationship to the risky point 10 and the state of the person 11, and creates a management table (FIG. 5) for the states of persons 11 (step S5).

In the case where it is determined, based on the management table (an entry) for the risky point 10 and the state of the person registered in the management table for the states of persons 11, that the person 11 is in a state where there is a high possibility of being put in danger at the risky point 10 (YES in step S6), the server 20 outputs (transmits) information indicating a warning to the speaker 4 (step S7).

Figure 9:
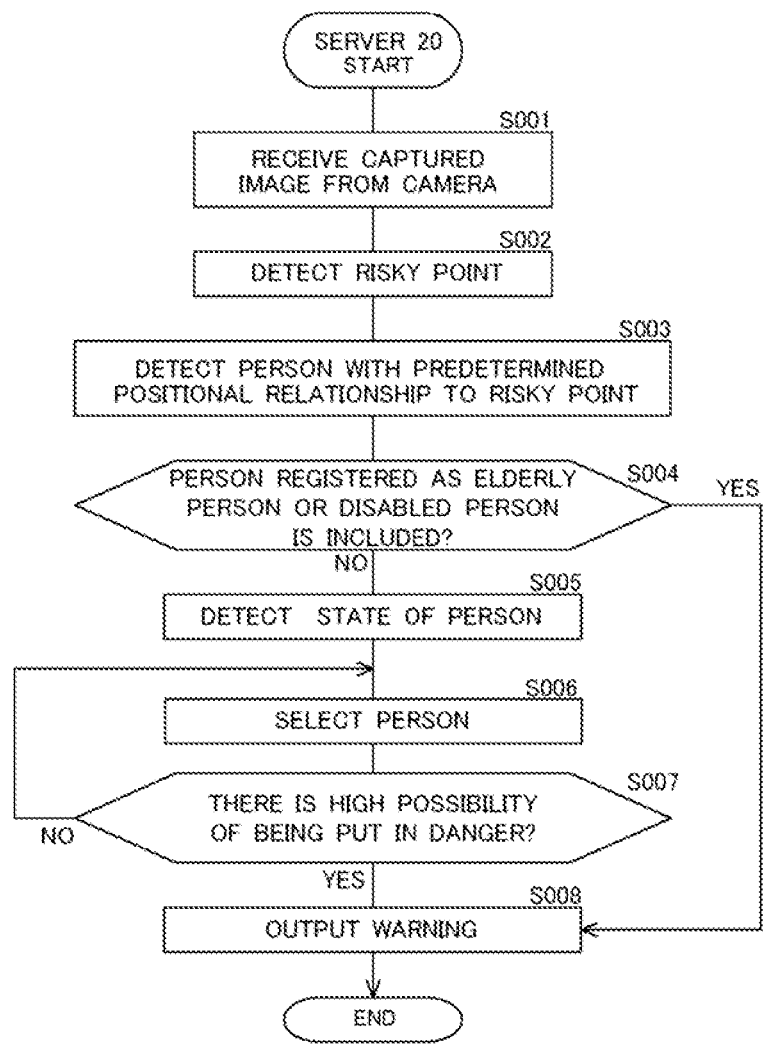
FIG. 9 is a flowchart illustrating an example process by the server.

FIG. 9 describes a case where the server 20 determines, in step S4, that the person 11A whose terminal 30 and attribute (elderly person or disabled person) are registered is at a predetermined positional relationship to the risky point 10 (YES in S4). In this case, the server 20 outputs (transmits) information indicating a warning to the terminal 30 of the person 11A (step S4A). Then, the processes in steps S5 to S7 are performed. Accordingly, a warning for the person 11A is transmitted to the terminal 30, and a warning for the person 11 is transmitted to the speaker 4.

FIG. 9 is a flowchart illustrating an example process by the processor 21 of the server 20. FIG. 9 illustrates an example operation different from the one in FIGS. 7 and 8. In step S001, the processor 21 receives captured images from the cameras 3 and 3A.

In step S002, the processor 21 detects a risky point 10 from the captured images, and creates the management table for risky points 10. In step S003, the processor 21 detects a person with a predetermined positional relationship to the risky point 10 (for example, a person present within the circle 15 in FIG. 1) A person 11 may be detected by performing facial recognition on the captured image. A person 11A may be detected by using the positional information of the terminal 30 that is received by the server 20 from the terminal 30.

In step S004, the processor 21 acquires information indicating the attribute of a person, and determines whether the person has a predetermined attribute. That is, the processor 21 acquires the registration information, stored in the memory 22, about the terminal 30 and the attribute (elderly person or disabled person), and determines whether or not the person 11A whose terminal 30 and attribute (elderly person or disabled person) are registered in the server 20 is included as a person with a predetermined positional relationship. At this time, the process proceeds to step S008 in the case where the person 11A who is registered as an elderly person or a disabled person is determined to be included; otherwise, the process proceeds to step S005.

In the case where the process proceeds from step S004 to step S008, processes from step S005 to S007 are skipped. This aspect differs from the example operation illustrated in FIG. 8. The processor 21 performs a process of transmitting information indicating a warning to the terminal 30 of the person 11A by controlling the communication IF 23. That is, the communication IF 23 (an output unit) transmits information indicating a warning irrespective of the state of the person (regardless of the state of the person). This is to increase safety of movement by urging the person 11A who is an elderly person or a disabled person to pay attention. Information indicating a warning may include information indicating the state of risk at the risky point and information indicating the state of a person who is highly likely to be put in danger.

Furthermore, in step S008, the processor 21 outputs the information indicating a warning also to the speaker 4 corresponding to the risky point 10. This is to increase safety by repeatedly transmitting a warning to the person 11A. This operation is also different from the example operation illustrated in FIG. 8.

In the case where the process proceeds to step S005, the processor 21 detects the state of a person 11 through image recognition or image analysis on the captured image, and registers the state of the person 11 in the management table for persons 11.

The processor 21 determines, based on the state of the person, whether or not the person is in a state where there is a high possibility of being put in danger at the risky point 10. That is, the processor 21 selects one person (entry) in a predetermined order (such as an order of registration) from the management table for persons 11 (step S006).

The processor 21 determines whether the state of the person 11 registered in the selected entry matches the state, registered in the entry of the management table for risky points 10, where there is a high possibility of being put in danger (step S007). In the case where the state where there is a high possibility of being put in danger is determined in step S007, the process proceeds to step S008; otherwise, the process returns to step S006. In the case where the process proceeds from step S007 to step S008, a warning is output (transmitted) to the speaker 4 corresponding to the risky point 10.

A plurality of examples will be given in relation to the process in step S007. For example, a case is assumed where the process in step S007 is performed for persons Y1, Y2, and Y3 (FIG. 5) who are registered in the management table for persons 11 and who are each given as the person 11 for whom comparison with the entry for the risky point A in FIG. 4 (corresponding to the frozen point 10a in FIG. 2) is to be performed, the process in step S007 being performed in the order of the person Y2, the person Y3, and the person Y1.

In relation to the risky point A, the person Y2 in FIG. 5 is moving away from the risky point A. Accordingly, in step S007, it is determined that the state where there is a high possibility of being put in danger at the risky point 10 is not true, and a warning is not issued. Furthermore, the person Y3 in FIG. 5 is moving in a different direction from the risky point A. Also in this case, in step S007, it is determined that the state where there is a high possibility of being put in danger at the risky point 10 is not true, and a warning is not issued.

In contrast, the person Y1 in FIG. 5 is approaching the risky point A. Furthermore, the person Y1 is riding a bicycle. This matches the state 3 in the entry for the risky point A illustrated in FIG. 4. Accordingly, in step S007, it is determined that the person Y1 is in a state where there is a high possibility of being put in danger at the risky point 10, and a warning is issued.

Now, a case will be assumed where, unlike in the above-described case, the process in step S007 is performed in the order of the person Y1, the person Y2, and the person Y3. In the case where the state where the person Y1 is highly likely to be put in danger at the risky point 10 is determined in the process in step S007 for the person Y1, determination in step S003 is not performed for the persons Y2 and Y3. This is because a warning sound or audio of information about a warning is sounded in a certain area through notification of warning using the speaker 4, and the persons Y1, Y2, and Y3 are each able to hear the warning.

Furthermore, in relation to the risky point A, the processor 21 determines the state where there is a high possibility of being put in danger, in the case where the state of the person 11 is a state where the movement speed is exceeding a threshold. The movement speed may be determined from a time difference between frames of the captured image from the camera 3 or 3A and a movement distance of the person 11, for example. Furthermore, in the case where the terminal 30 is registered with the server 20 but the attribute is not registered, the movement speed may be determined from an amount of change in the position information of the terminal 30 and a time taker, for the change.

A description will be further given of the process in step S007 for each of the risky points B, C, D, and E illustrated in FIG. 4. The risky point B corresponds to the construction point 10c in FIG. 2. The state of risk at the risky point B is that a construction work is being performed at a high level, and there is a possibility of an object failing on the head of a person (that is, of putting the person in danger). In the present embodiment, in the case where the person 11 is approaching the risky point B and is not wearing a helmet, the processor 21 determines that the possibility of being put in danger at the risky point B is greater than in a case where a helmet is worn. In this manner, the processor 21 (the controller) determines that the state where there is a high possibility of being put in danger is true, in a case where equipment that enables the person 11 to avoid risk at the construction point 10c is absent, and the processor 21 issues a warning. When the warning is received, the person 11 may take a detour around the risky point B or may cope with the risk by wearing a helmet.

Furthermore, the risky point C corresponds to the risky point due to the obstacle 10b in FIG. 2. The state of risk is that the obstacle 10b is disposed on the movement route (the road 13B), and that one has to move by avoiding the obstacle 10b. At this time, if a person riding a bicycle does not notice the obstacle 10b and moves the bicycle at a speed for when there is no obstacle, the person possibly collides into the obstacle 10b or possibly collides into a vehicle traveling on the road 13B by unnecessarily swelling out onto a roadway. Moreover, a case is also conceivable where a vehicle coming from the opposite direction is not swiftly noticed due to forward visibility being reduced by the obstacle 10b.

Furthermore, a disabled person or an elderly person whose movement speed is slower than that of an able-bodied person is made to spend a longer time moving on the roadway, and is thus put in danger because the possibility of coming into contact with a vehicle traveling on the roadway is increased. Accordingly, in relation to the risky point C (the obstacle 10b), the following steps are taken in a state where the risky point C is being approached and the movement speed is exceeding a threshold (a first threshold) or the movement speed is below a threshold (a second threshold). That is, the processor 21 determines that the state where the first threshold is exceeded and the state where the second threshold is not reached are states where the possibility of being put in danger at the risky point is higher than in a state of moving at a speed below the first threshold and at or greater than the second threshold, and the processor 21 thus issues a warning. A person in a state where the movement speed exceeds the threshold may thus avoid risk by reducing the speed and moving carefully. Furthermore, a person in a state where the movement speed is below the threshold may be urged by the warning to take a detour. Information for urging a detour may be included in the warning.

Moreover, the risky point D is a point where a traffic mirror is hidden by leaves and branches of plants, making it difficult to see vehicles and bicycles that are traveling. In the present embodiment, a warning is issued to a person in a state of approaching the risky point 10 regardless of the movement speed, and the person is urged to carefully enter the intersection.

Moreover, the risky point E is a point where a handrail (a guard rail: an example of traffic support structure) provided between the roadway and a sidewalk is impaired (damaged) by a traffic accident, thus becoming an obstacle to movement of a person who usually walks holding the handrail. Moreover, when impaired, the handrail may fail to sufficiently function as a protective fence from vehicles on the roadway.

In this case, if the state of a person is a state of approaching the risky point E and the movement speed is below the threshold or the person is walking with a stick, the state where there is a high possibility of being put in danger at the risky point E is determined, and a warning is issued. Use of the movement route may be expected to be avoided due to the warning until the handrail is repaired.

<Effects of Embodiment>

According to the embodiment described above, the server 20 includes the processor 21 (the controller) that determines, based on the state of the person 11 with a predetermined positional relationship to the risky point 10, whether or not the possibility of the person 11 being put in danger at the risky point 10 is high. Furthermore, the server 20 includes the communication IF 23 (the output unit) that outputs information indicating a warning in a case where the state where there is a high possibility of the person 11 being put in danger is determined. A warning may thus be issued to a person who is highly likely to be put in danger at a risky point before the person reaches the risky point. A person receiving the warning may stop approaching the risky point, take a detour, or act carefully.

Furthermore, according to the embodiment, in a case where safety is reduced than in normal times (that is, before occurrence of an event) due to a change in the state caused by occurrence of an event on the movement route of a person, such as freezing, placement of an obstacle, construction work, or damaging of equipment, a warning may be issued to a person who is highly likely to be put in danger by the change. A possibility of a person being put at unexpected risk because of not knowing the change may thus be reduced.

<Modification>

Figure 10:
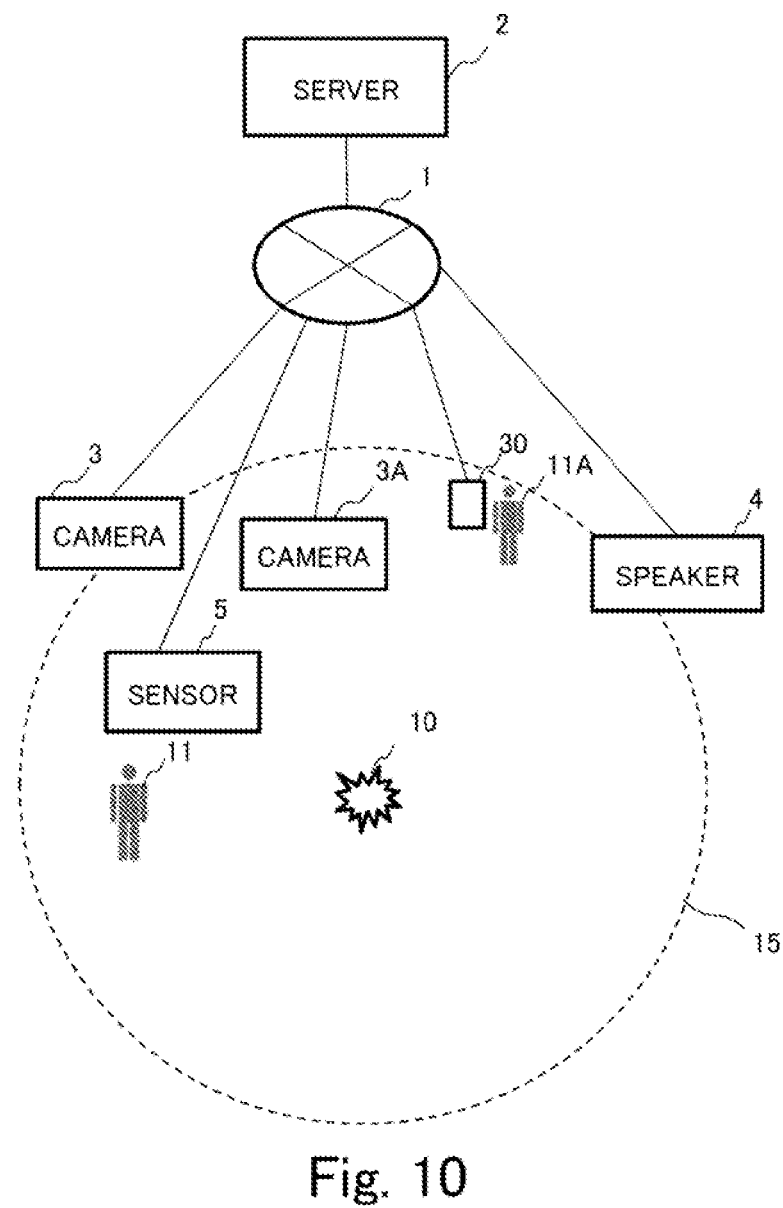
FIG. 10 illustrates a modification of the information processing system.
Figure 11:
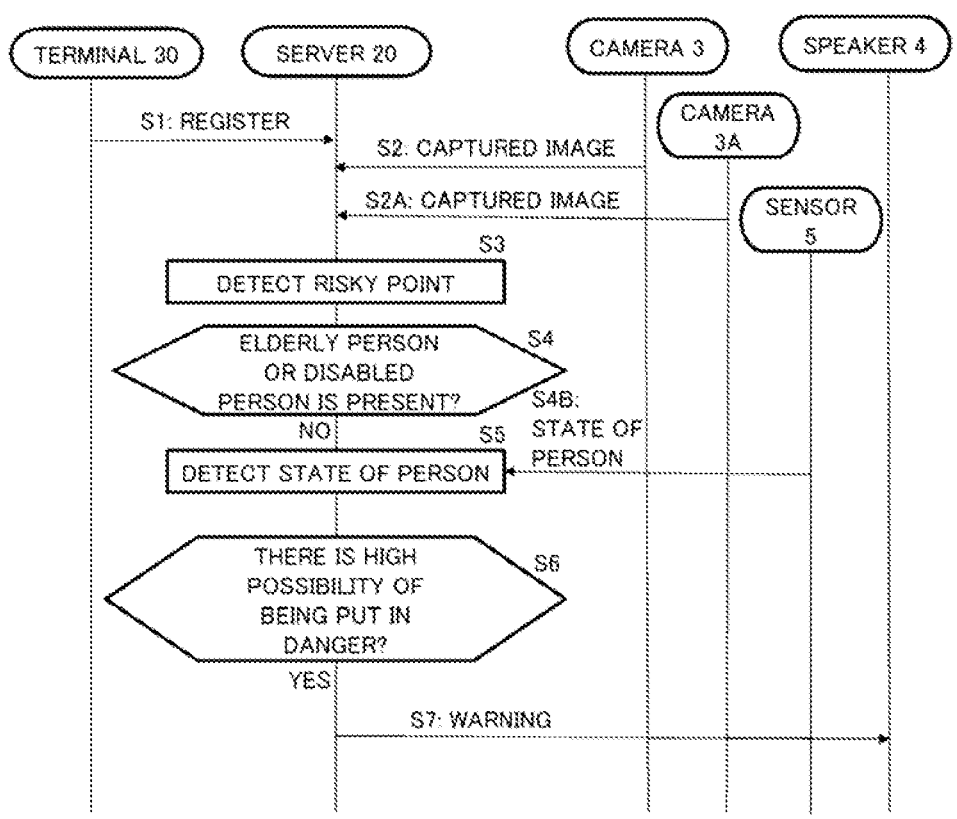
FIG. 11 is a sequence diagram illustrating an example operation of an information processing system according to the modification.

FIGS. 10 and 11 are diagrams illustrating a modification of the embodiment. As illustrated in FIG. 10, a sensor 5 that detects the state of a person 11 with a predetermined positional relationship to the risky point 10 is included in the network 1. For example, the sensor 5 is a radar speed measuring device that measures the movement speed of an object, and the sensor 5 transmits the movement speed of a person to the server 20 (see step S4B in FIG. 11). The movement speed may be used to determine whether the movement speed of the person exceeds a threshold or whether the movement speed of the person is below a threshold.

Furthermore, in the embodiment, the risky point 10 is detected from the captured image from the camera 3 or 3A, but the risky point 10 may alternatively be detected by using the sensor 5 different from the cameras 3 and 3A. In this case, at least one temperature sensor that measures a road surface temperature of a road is adopted as the sensor 5, for example. An area where the temperature measured by the temperature sensor is a temperature that is below a freezing point at which freezing may be determined may be taken as the risky point 10. By using the at least one temperature sensor as the sensor 5 on the roads 13A and 13B and the intersection in FIG. 2, the risky point 10a may be detected. That is, the server 20 may receive a measured temperature (a measurement result) from the sensor 5 (each temperature sensor) via the network 1, and the processor 21 may acquire the measurement result from each temperature sensor, identify an area where freezing of the road surface may be determined based on the measurement result from each temperature sensor, and detect the area of the identified road surface as the risky point 10a.

<Others>

The embodiment described above is merely an example, and the present disclosure may be changed as appropriate within the scope of the disclosure.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiment described above to a computer, and by one or more processors of the computer reading out and executing the programs. Such computer programs may be provided to the computer by a non-transitory computer-readable storage medium that can be connected to a system bus of the computer, or may be provided to the computer via a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), for example. Furthermore, the non-transitory computer-readable storage medium may include read-only memories (ROMs), random access memories (RAMs), EPROMs, EEPROMs, magnetic cards, flash memories, optical cards, and any type of medium suitable for storing electronic instructions.

What is claimed is:

1. An information processing apparatus comprising:
a communication interface;
a memory in which information indicating one or more states of a person that are associated with one or more states of risks are stored; and
a controller configured to execute:
receiving registration information via the communication interface, the registration information transmitted from a mobile terminal and including identification information of the mobile terminal and information indicating an attribute of a person carrying the mobile terminal, the attribute of the person being at least one of a person being an elderly person and a person being a disabled person;
storing the registration information in the memory;
receiving a captured image captured by a camera via the communication interface;
detecting a risky point from the captured image by performing a determination process using matching with an image of a state where safety is secured, the risky point being a point, on a movement route of persons, where safety of movement is reduced by occurrence of an event compared to before the occurrence of the event;

detecting, from the captured image, information indicating a state of risk at the risky point and information indicating a position of the risky point;
detecting, from the captured image, a person of a first group with a predetermined positional relationship to the risky point by performing a facial recognition on the captured image;
receiving positional information of the mobile terminal via the communication interface, the positional information transmitted from the mobile terminal on a regular basis;
detecting a person of a second group with the predetermined positional relationship to the risky point, the person of the second group carrying the mobile terminal, based on the information indicating the position of the risky point and the positional information of the mobile terminal;
acquiring the information indicating the attribute of the person carrying the mobile terminal from the registration information stored in the memory;
determining whether or not the person of the second group is at least one of the elderly person and the disabled person based on the information indicating the attribute of the person;
creating information indicating a first warning based on the information indicating the state of risk at the risky point in a case where the person of the second group is determined to be at least one of the elderly person and the disabled person, the information indicating the first warning including the information indicating the state of risk at the risky point;
transmitting the information indicating the first warning to the mobile terminal that the person of the second group carries via the communication interface based on the identification information of the mobile terminal and transmitting the information indicating the first warning to a speaker or a display device nearest to the risky point via the communication interface based on the information indicating the position of the risky point;
detecting information indicating a state of the person of the first group by performing an image recognition on the captured image in a case where the person of the second group is determined to be neither of the elderly person and the disabled person;
determining whether or not the state of the person of the first group is a state where there is a high possibility of being put in danger, among a plurality of states of the person of the first group assumable at the risky point based on the information indicating the one or more states of the person stored in the memory and the information indicating the state of the person of the first group;
creating information indicating a second warning based on the information indicating the state of risk at the risky point and the information indicating the state of the person of the first group in a case where the state of the person of the first group is determined to be the state where there is the high possibility of being put in danger, the information indicating the second warning including the information indicating the state of risk at the risky point and information indicating a state of a person who is highly likely to be put in danger, the information indicating the state of the person who is highly likely to be put in danger corresponding to the state of risk; and
transmitting the information indicating the second warning to the speaker or the display device via the communication interface based on the information indicating the position of the risky point.

2. The information processing apparatus according to claim 1, wherein the captured image from the camera is an image capturing a scene in a town.

3. The information processing apparatus according to claim 1, wherein the risky point includes at least one of a point on the movement route where a road surface is frozen or is submerged in water, a point on the movement route where a depression or a step is formed, a point on the movement route where an obstacle is placed, a construction or cleaning point on the movement route or of a structure facing the movement route, a point where a traffic support structure provided on the movement route is damaged or removed, and a point where visibility of a traffic mirror is reduced.

4. The information processing apparatus according to claim 1, wherein, in a case where a movement speed of the person exceeds a threshold, the controller determines the state where there is a high possibility of being put in danger.

5. The information processing apparatus according to claim 1, wherein, in a case where a movement speed of the person is below a threshold, the controller determines the state where there is a high possibility of being put in danger.

6. The information processing apparatus according to claim 1, wherein, in a case where the person does not have equipment that enables the person to avoid risk at the risky point, the controller determines the state where there is a high possibility of being put in danger.

7. An information processing method performed by an information processing apparatus including a communication interface and a memory in which information indicating one or more states of a person that are associated with one or more states of risks are stored, the method comprising:
receiving registration information via the communication interface, the registration information transmitted from a mobile terminal and including identification information of the mobile terminal and information indicating an attribute of a person carrying the mobile terminal, the attribute of the person being at least one of a person being an elderly person and a person being a disabled person;
storing the registration information in the memory;
receiving a captured image captured by a camera via the communication interface;
detecting a risky point from the captured image by performing a determination process using matching with an image of a state where safety is secured, the risky point being a point, on a movement route of persons, where safety of movement is reduced by occurrence of an event compared to before the occurrence of the event;
detecting, from the captured image, information indicating a state of risk at the risky point and information indicating a position of the risky point;
detecting, from the captured image, a person of a first group with a predetermined positional relationship to the risky point by performing a facial recognition on the captured image;
receiving positional information of the mobile terminal via the communication interface, the positional information transmitted from the mobile terminal on a regular basis;
detecting a person of a second group with the predetermined positional relationship to the risky point, the person of the second group carrying the mobile terminal, based on the information indicating the position of the risky point and the positional information of the mobile terminal;

acquiring the information indicating the attribute of the person carrying the mobile terminal from the registration information stored in the memory;

determining whether or not the person of the second group is at least one of the elderly person and the disabled person based on the information indicating the attribute of the person;

creating information indicating a first warning based on the information indicating the state of risk at the risky point in a case where the person of the second group is determined to be at least one of the elderly person and the disabled person, the information indicating the first warning including the information indicating the state of risk at the risky point;

transmitting the information indicating the first warning to the mobile terminal that the person of the second group carries via the communication interface based on the identification information of the mobile terminal and transmitting the information indicating the first warning to a speaker or a display device nearest to the risky point via the communication interface based on the information indicating the position of the risky point;

detecting information indicating a state of the person of the first group by performing an image recognition on the captured image in a case where the person of the second group is determined to be neither of the elderly person and the disabled person;

determining whether or not the state of the person of the first group is a state where there is a high possibility of being put in danger, among a plurality of states of the person of the first group assumable at the risky point based on the information indicating the one or more states of the person stored in the memory and the information indicating the state of the person of the first group;

creating information indicating a second warning based on the information indicating the state of risk at the risky point and the information indicating the state of the person of the first group in a case where the state of the person of the first group is determined to be the state where there is the high possibility of being put in danger, the information indicating the second warning including the information indicating the state of risk at the risky point and information indicating a state of a person who is highly likely to be put in danger, the information indicating the state of the person who is highly likely to be put in danger corresponding to the state of risk; and transmitting the information indicating the second warning to the speaker or the display device via the communication interface based on the information indicating the position of the risky point.

8. The information processing method according to claim 7, wherein, in a case where a movement speed of the person exceeds a threshold or in a case where the movement speed of the person is below a threshold, the information processing apparatus determines the state where there is a high possibility of being put in danger.

9. The information processing method according to claim 7, wherein, in a case where the person does not have equipment that enables the person to avoid risk at the risky point, the information processing apparatus determines the state where there is a high possibility of being put in danger.

10. A non-transitory storage medium storing a program thereon, which when executed by a computer of an information processing apparatus, including a communication interface and a memory in which information indicating one or more states of a person that are associated with one or more states of risk are stored, causes the computer of the information processing apparatus to execute operations including:

receiving registration information via the communication interface, the registration information transmitted from a mobile terminal and including identification information of the mobile terminal and information indicating an attribute of a person carrying the mobile terminal, the attribute of the person being at least one of a person being an elderly person and a person being a disabled person;

storing the registration information in the memory;

receiving a captured image captured by a camera via the communication interface;

detecting a risky point from the captured image by performing a determination process using matching with an image of a state where safety is secured, the risky point being a point, on a movement route of persons, where safety of movement is reduced by occurrence of an event compared to before the occurrence of the event;

detecting, from the captured image, information indicating a state of risk at the risky point and information indicating a position of the risky point;

detecting, from the captured image, a person of a first group with a predetermined positional relationship to the risky point by performing a facial recognition on the captured image;

receiving positional information of the mobile terminal via the communication interface, the positional information transmitted from the mobile terminal on a regular basis;

detecting a person of a second group with the predetermined positional relationship to the risky point, the person of the second group carrying the mobile terminal, based on the information indicating the position of the risky point and the positional information of the mobile terminal;

acquiring the information indicating the attribute of the person carrying the mobile terminal from the registration information stored in the memory;

determining whether or not the person of the second group is at least one of the elderly person and the disabled person based on the information indicating the attribute of the person;

creating information indicating a first warning based on the information indicating the state of risk at the risky point in a case where the person of the second group is determined to be at least one of the elderly person and the disabled person, the information indicating the first warning including the information indicating the state of risk at the risky point;

transmitting the information indicating the first warning to the mobile terminal that the person of the second group carries via the communication interface based on the identification information of the mobile terminal and transmitting the information indicating the first warning to a speaker or a display device nearest to the risky point via the communication interface based on the information indicating the position of the risky point;

detecting information indicating a state of the person of the first group by performing an image recognition on the captured image in a case where the person of the second group is determined to be neither of the elderly person and the disabled person;

determining whether or not the state of the person of the first group is a state where there is a high possibility of being put in danger, among a plurality of states of the person of the first group assumable at the risky point based on the information indicating the one or more states of the person stored in the memory and the information indicating the state of the person of the first group;

creating information indicating a second warning based on the information indicating the state of risk at the risky point and the information indicating the state of the person of the first group in a case where the state of the person of the first group is determined to be the state where there is the high possibility of being put in danger, the information indicating the second warning including the information indicating the state of risk at the risky point and information indicating a state of a person who is highly likely to be put in danger, the information indicating the state of the person who is highly likely to be put in danger corresponding to the state of risk; and transmitting the information indicating the second warning to the speaker or the display device via the communication interface based on the information indicating the position of the risky point.

* * * * *